United States Patent [19]
Rabe

[11] Patent Number: 4,568,061
[45] Date of Patent: Feb. 4, 1986

[54] FLOW CONTROL ASSEMBLY

[75] Inventor: George B. Rabe, Sparta, N.J.

[73] Assignee: Foster Wheeler Energy Corporation, Livingston, N.J.

[21] Appl. No.: 538,598

[22] Filed: Oct. 3, 1983

[51] Int. Cl.[4] .............................................. F16K 5/06
[52] U.S. Cl. .................................... 251/315; 137/613
[58] Field of Search ....................... 251/315, 309, 210; 137/613

[56] References Cited

U.S. PATENT DOCUMENTS 2,749,940  6/1956  Bronson ............................... 137/613
2,926,884  3/1960  Clinkenbeard ...................... 251/210
4,275,763  6/1981  Fahrig ................................. 137/613

FOREIGN PATENT DOCUMENTS 570353 12/1957 Italy ..................................... 137/613

Primary Examiner—A. Michael Chambers
Assistant Examiner—John C. Fox
Attorney, Agent, or Firm—Marvin A. Naigur; John E. Wilson; Warren B. Kice

[57] ABSTRACT

A flow control assembly in which a valve member is movable in a housing between a first position in which it permits the flow of material from an inlet to said housing, through said housing and to an outlet in said housing, and a second position in which it prevents the flow. A shield is provided in said housing which is movable to and from a position in which it shields the valve member from said material.

6 Claims, 6 Drawing Figures

FLOW CONTROL ASSEMBLY

BACKGROUND OF THE INVENTION

This invention relates to a flow control assembly and more particularly, to such an assembly including a valve for controlling the flow of abrasive material.

Although there are a countless number of valves used to control the flow of fluids and materials, the number of valves available for controlling the flow of abrasive material is somewhat limited The valves that have evolved for controlling the flow of abrasive material usually are in the form of a ball valve, or the like, which is turned from a first position in which it permits flow between the inlet and outlet conduits to a second position in which it prevents the flow. A seal is normally located in connection with the valve, usually at the downstream end thereof, which provides a seal between the ball valve surface and its housing. However, when the flow of abrasive material is being controlled and the valve is partially opened or closed, the seal is exposed to, and often damaged by, the abrasive material. Also, the valve surface itself is exposed to the material.

One suggested solution to this problem is to provide a seal at the upstream end of the ball valve so that the particulate material will pass through the seal. However, in this instance, the ball valve surface is still exposed to the abrasive material which can cause damage.

SUMMARY OF THE INVENTION

It is therefore an object of the present invention to provide a control assembly for controlling the flow of abrasive material which does not expose the valve seal to damage.

It is a further object of the present invention to provide a flow control assembly of the above type in which the valve itself is protected from the abrasive material being controlled.

Toward the fulfillment of these and other objects, the flow control assembly of the present invention comprises a housing having a valve member movable therein between a first position in which a flow of fluid from an inlet to the housing is permitted and a second position in which the flow is prevented. A shield is movable in the housing for shielding the valve member to prevent damage to the valve member and to its seal.

BRIEF DESCRIPTION OF THE DRAWINGS

The above brief description, as well as further objects, features, and advantages, of the present invention will be more fully appreciated by reference to the following detailed description of a presently preferred but nonetheless illustrative embodiment in accordance with the present invention, when taken in conjunction with the accompany drawings wherein.

DESCRIPTION OF THE PREFERRED EMBODIMENT

Figure 1:
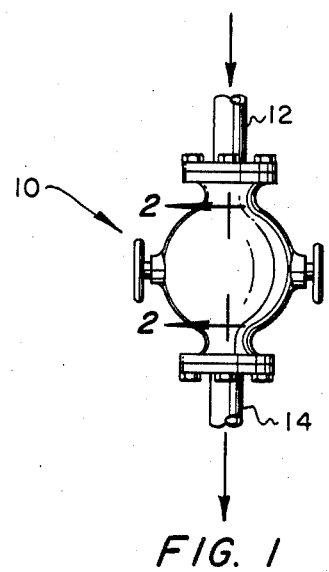
FIG. 1 is a front elevational view of the flow control assembly of the present invention.
Figure 2:
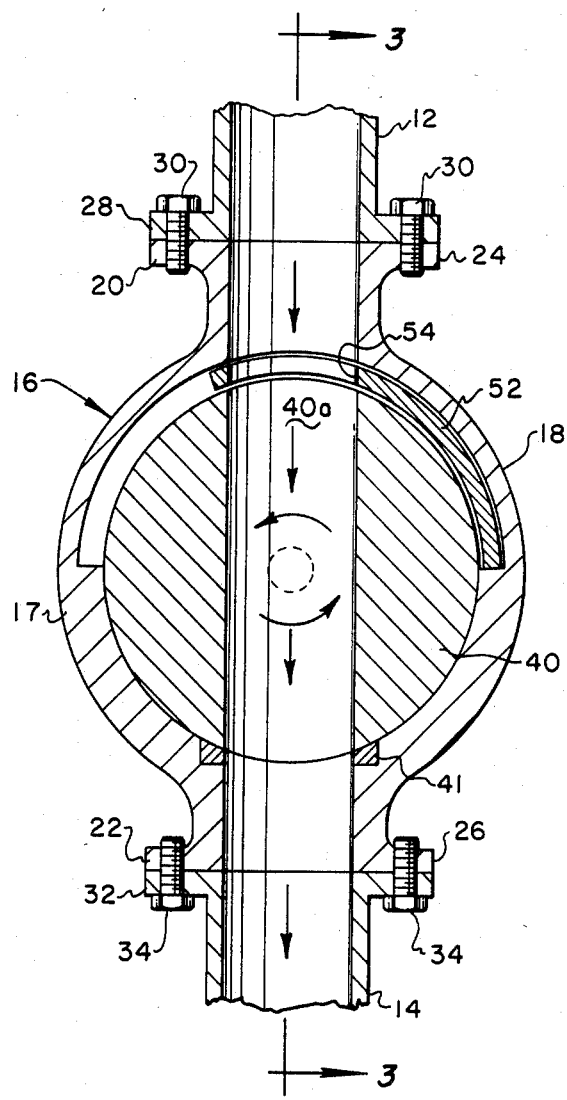
FIG. 2 is a cross sectional view taken along the line 2—2 of FIG. 1.

Referring specifically to FIGS. 1 and 2 of the drawings, the reference numeral 10 refers in general to the flow control assembly of the present invention which is connected between an inlet conduit 12 and an outlet conduit 14 for controlling the flow of fluid therethrough. For the purposes of example, it will be assumed that the material flowing through the conduits 12 and 14 and the control assembly of the present invention will be a particulate abrasive material such as coal, or the like.

As shown in FIG. 2 the assembly 10 includes a hollow spherical housing 16 formed by two half sections 17 and 18. The housing section 17 has semicircular flanges 20 and 22 disposed at each end thereof and the housing section 18 has semicircular flanges 24 and 26 formed at each end thereof. The flanges 20 and 24 together form a continuous arcuate flange which is adapted to engage a corresponding flange 28 formed on the inlet conduit 12 and which is fastened thereto by bolts 28. In a similar manner, the flanges 22 and 26 form a continuous annular flange which engages a corresponding flange 32 formed on the outlet conduit 14 and which is connected thereto by bolts 34.

A valve member, in the form of a ball valve 40, having a bore 40a extending therethrough, is mounted in the housing 16 with a slight clearance to permit its rotation. In the "open" position as shown in FIG. 2, the bore 40a is in alignment with the conduits 12 and 14 to permit the flow of material through the latter bore, as will be described.

A seal 41, in the form of a metal gasket, or the like, is provided in an annular notch formed in the inner wall of the housing 16 to provide a seal for the ball valve 40 during its movement.

Figure 3:
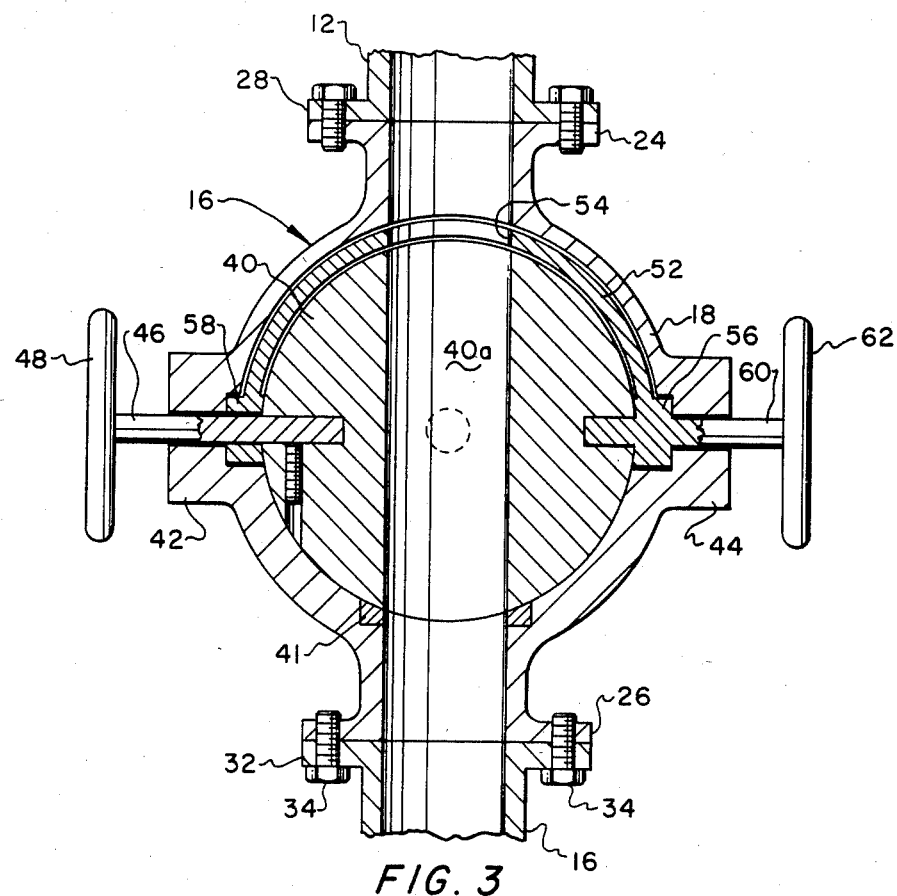
FIG. 3 is a cross sectional view taken along the line 3—3 of FIG. 2.

As shown in FIG. 3, a pair of diametrically opposed bosses 42 and 44 are formed on the outer surface of the housing 16, in a ninety degree, angularly spaced relation to the conduits 12 and 14 with each boss having a bore extending therethrough. A shaft 46 extends through the bore formed in the boss 42, into a bore formed in the ball valve 40 and is connected externally of the housing section 10 to a handle 48 for operating the ball valve. A set screw 50 is provided in the ball valve 40 for engaging the shaft 46 to secure it to the valve.

Figure 4:
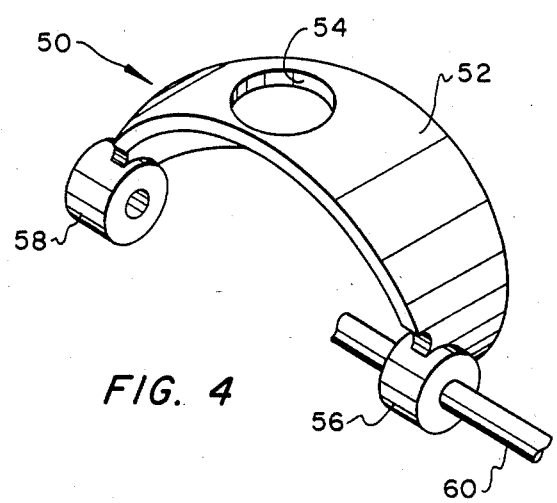
FIG. 4 is a perspective view of a component of the flow control assembly of the present invention.

A shield assembly, shown in general by the reference numeral 50, is better shown in connection with FIG. 4. The shield assembly 50 includes a curved arcuate shield plate 52 having an aperture 54 extending through a center portion thereof. Two bosses 56 and 58 are provided on the end portions of the plate 50 and a shaft 60 extends through the boss 56.

A portion of the upper inner wall portion of the housing 16 is notched, or cut-out, as shown in FIGS. 2 and 3, to receive the shield plate 52 which extends over a corresponding portion of the ball valve 40 in a slightly spaced relation thereto. The bosses 56 and 58 of the shield assembly 50 respectively extend in complementary enlargements formed in the interior wall surface of the housing 16, with the shaft 46 extending through a through opening formed in the boss 58 with adequate clearance to permit rotation.

The shaft 60 of the shield assembly 50 extends through the boss 44 and one end portion of the shaft is journaled in a bore formed in the ball valve 40 to permit rotation of the shield assembly 50 relative to the ball valve. As shown in FIG. 3 a handle 62 is provided on the other end portion of the shaft 60 for controlling the movement of the shield assembly. The diameter of the opening 54 through the shield plate 52 corresponds to the inner diameter of the inlet pipe 12, and the bore 40a of the ball valve 40. In the position of FIGS. 2 and 3 the opening 54 registers with the conduit 12 and the bore 40a so that the material flow between the conduits 12 and 14 is unimpeded.

Figure 5:
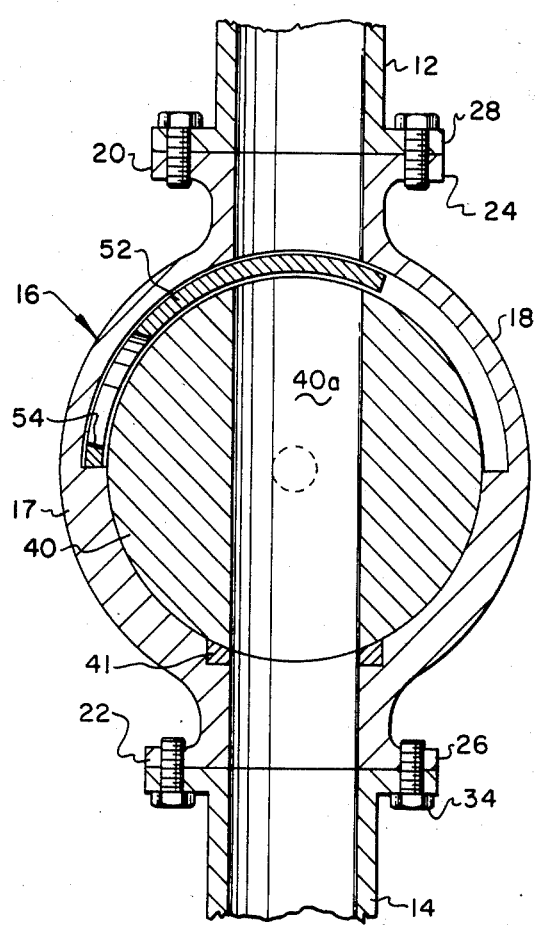
FIGS. 5 and 6 are views similar to FIG. 2 but showing the valve member and the shield of the flow control assembly in different positions.
Figure 6:
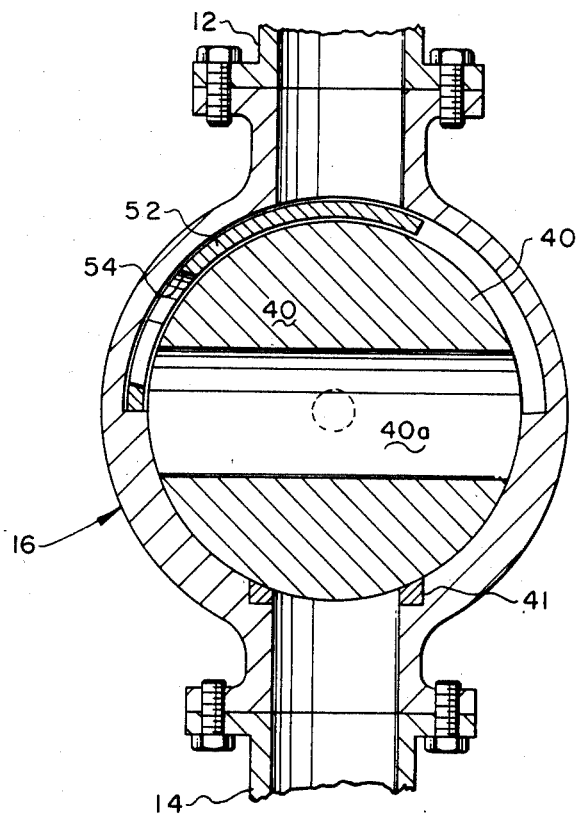

In operation, and assuming that the ball valve 40 and the shield plate 52 are in the open position shown in FIGS. 2 and 3, and that it is desired to close the valve to prevent the flow of the material from the inlet conduit 12 to the outlet conduit 14, the shield plate is initially moved to the position of FIG. 5 by rotating the handle 62 of the shield assembly 50. This places the solid portion of the shield plate 52 over the inlet to the bore 40a of the ball valve 40 after which the latter is moved from the position shown in FIGS. 2 and 3 to its closed position shown in FIG. 6 to prevent any material flow therethrough.

As a result of the foregoing, the shield plate 52 prevents the particulate material from directly impinging on the seal 41 when the latter is exposed during movement of the ball valve 40 to and from its open position, thus preventing any undue wear on the seal. Also, the shield plate 52 prevents any direct impingement of the particulate material on the outer surface of the ball valve 40 when the latter is initially moved to its closed position, which, of course, also prevents damage to the ball valve.

It is understood that modifications, changes, and substitutions are intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. A flow control assembly comprising a housing having an inlet and an outlet; a ball valve having a bore and movable in said housing between a first position in which said bore registers with said inlet and outlet to permit the flow of material from said inlet, through said housing and to said outlet, and a second position in which it prevents said flow; handle means secured to said ball valve and extending through said housing; a shield plate located in a slightly spaced relationship to the outer surface of said ball valve between said ball valve and said inlet and having a curvature complementary to a portion of the outer surface of said ball valve, said shield plate being movable to and from a position in which it shields said ball valve from said material; a handle secured to said shield plate and extending through said housing; and boss means extending from said shield plate and having an opening through which the handle means of said ball valve extends.

2. The assembly of claim 1 wherein said valve member is a ball valve having a bore extending therethrough which registers with said inlet and said outlet in said first position.

3. The assembly of claim 2 further comprising handle means secured to said ball valve and extending through said housing.

4. The assembly of claim 3 wherein said shield means comprises a shield plate located in a slightly spaced relationship to the outer surface of said ball valve and having a curvature complementary to a portion of the outer surface of said ball valve.

5. The assembly of claim 4 wherein said shield means further comprises a handle secured to said shield and extending through said housing.

6. A flow control assembly comprising a housing having an inlet, an outlet and a spherical chamber extending between said inlet and said outlet, a ball valve movable in said chamber between a first position in which it permits the flow of material from said inlet, through said housing and to said outlet, and a second position in which it prevents said flow; and a shield plate disposed in said chamber between said inlet and said valve member, said shield plate having a curvature corresponding to the curvature of a portion of the surface of said ball valve and being movable in said chamber to and from a position in which it shields said valve member from said material.

* * * * *